M. A. SMITH.
COATING MACHINE.
APPLICATION FILED FEB. 1. 1908.

905,472.

Patented Dec. 1, 1908.
10 SHEETS—SHEET 9.

WITNESSES

INVENTOR
Myron A. Smith.
BY A. M. Pierce,
ATTORNEY.

M. A. SMITH.
COATING MACHINE.
APPLICATION FILED FEB. 1, 1908.

905,472.

Patented Dec. 1, 1908.
10 SHEETS—SHEET 10.

UNITED STATES PATENT OFFICE.

MYRON A. SMITH, OF NEW YORK, N. Y.

COATING-MACHINE.

No. 905,472.

Specification of Letters Patent.

Patented Dec. 1, 1908.

Application filed February 1, 1908. Serial No. 413,774.

*To all whom it may concern:*

Be it known that I, MYRON A. SMITH, a citizen of the United States, residing at New York, in the county of New York and State of New York, have invented certain new and useful Improvements in Coating-Machines, of which the following is a specification, reference being had therein to the accompanying drawing.

My invention relates especially to mechanism employed for applying a coating of melted chocolate, or the equivalent, to candy centers, etc., and has for its object the provision of a machine whereby such coating may be applied in a very effective manner.

To attain the desired end, my invention consists in certain novel and useful combinations or arrangements of parts and peculiarities of construction and operation, all of which will be hereinafter first fully described and then pointed out in the claims.

In the drawings, Fig. 9 is a like view at line c—c of Fig. 4. Fig. 18 is a vertical sectional view at line p—p of Fig. 1.

Like numerals of reference, wherever they occur, indicate corresponding parts in all the figures.

1 is the main frame of the machine wherein is mounted a coating material tank 2, having a hot water chamber 3, and heating pipes 4.

5 is a funnel for supplying coating material to the tank 2.

6 is a driving shaft having a sprocket wheel 7 for driving a wheel 9 by a chain 8, the wheel 9 being mounted on a stud 10, the hub of the sprocket carrying a gear 11 meshing with a gear 12 on a shaft 13 provided with sprockets 14.

15, 16 and 17 are shafts journaled in the main frame, and bearing sprockets 14.

Figures 5, 6, 7, 8:
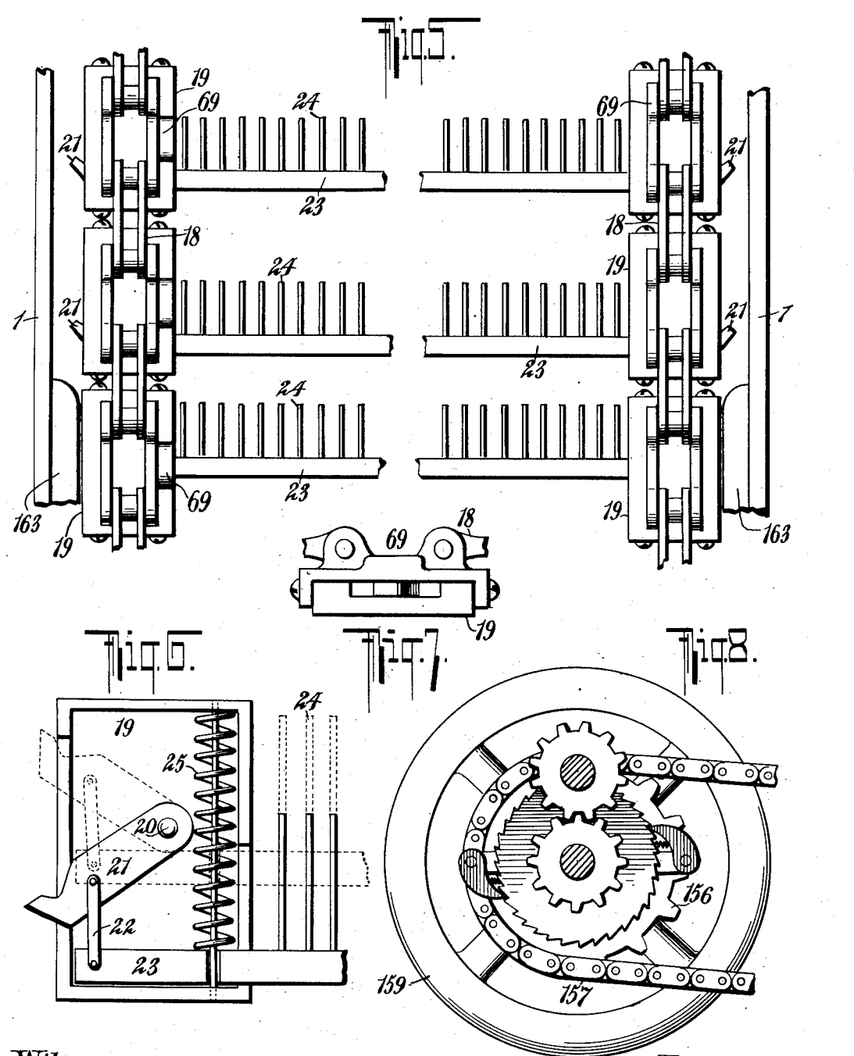
Figs. 5, 6 and 7 are enlarged detail views of a part of the carrying mechanism.
Fig. 8 is an enlarged vertical sectional view at line b—b of Fig. 4.
Figure 8:
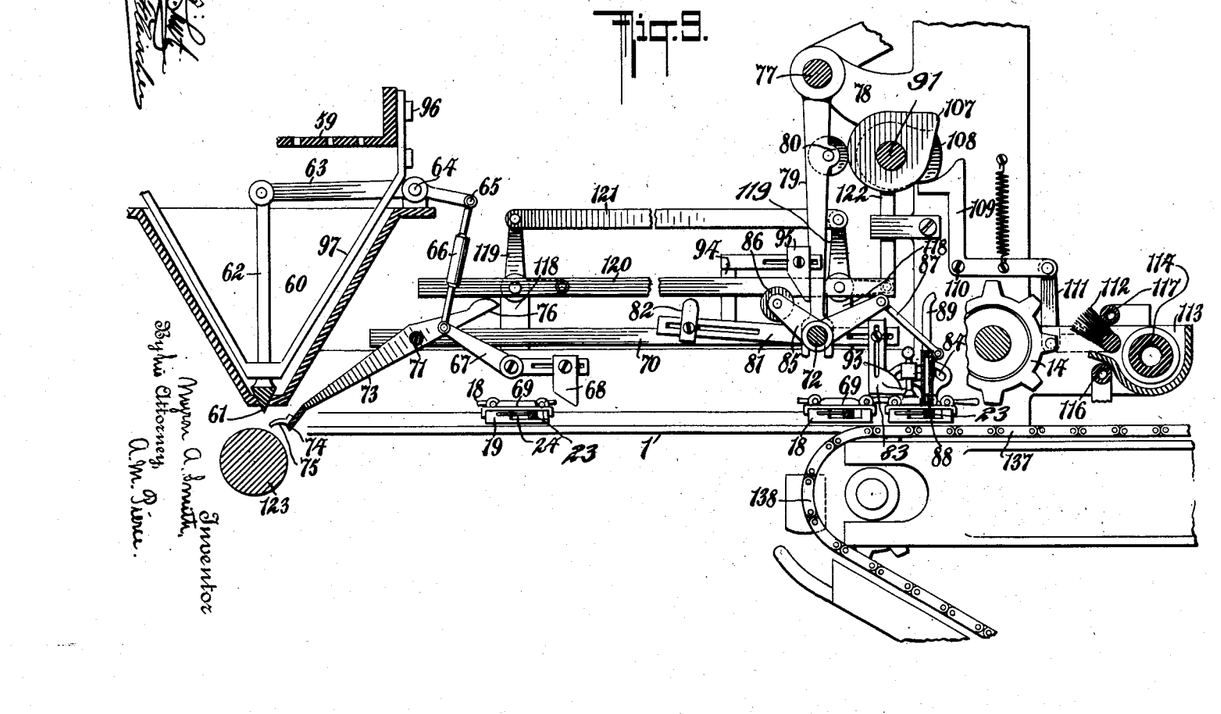

18 are chains passing over the sprockets 14. The chains 18 have links 19 wherein at 20 are pivoted dogs 21 connected by links 22 to a carrier bar 23 having projecting fingers 24 for the support of centers to be coated, the bar 23 being normally held in the position shown in Fig. 6 by a spring 25.

Figures 1, 2:
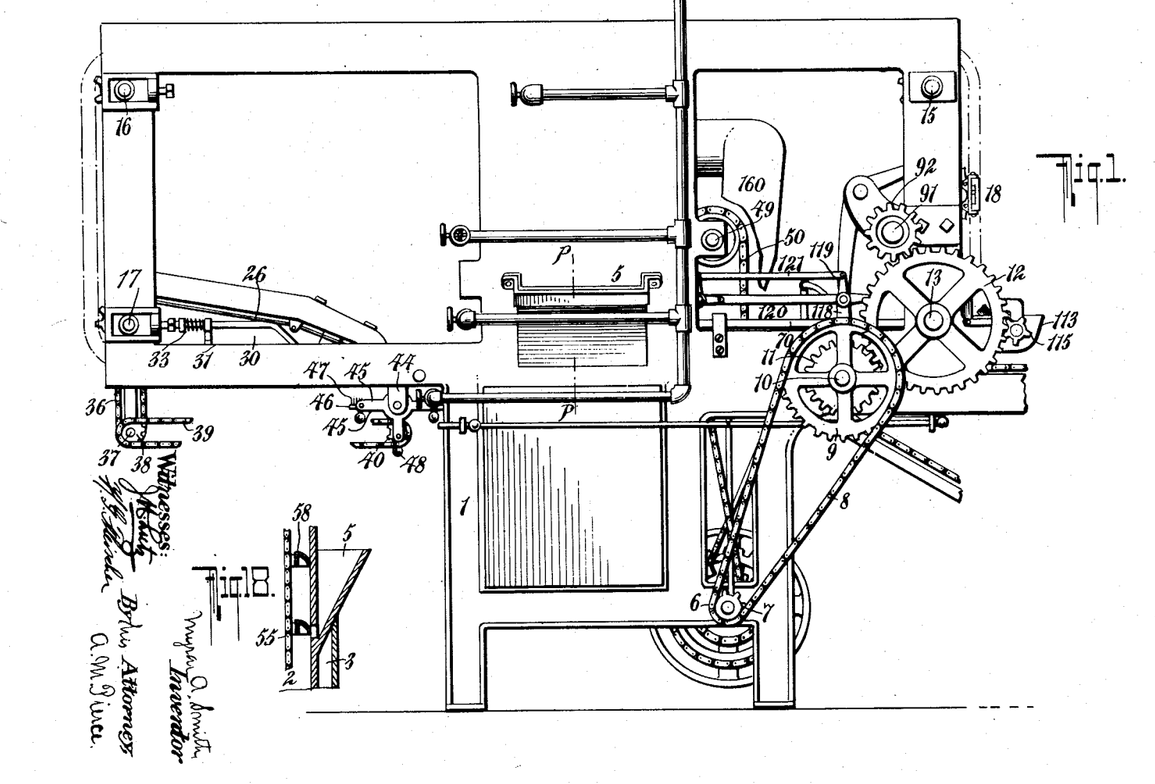
Figure 1 is an elevation of one side of my coating machine.
Fig. 2 is a like view of the opposite side.
Figure 2:
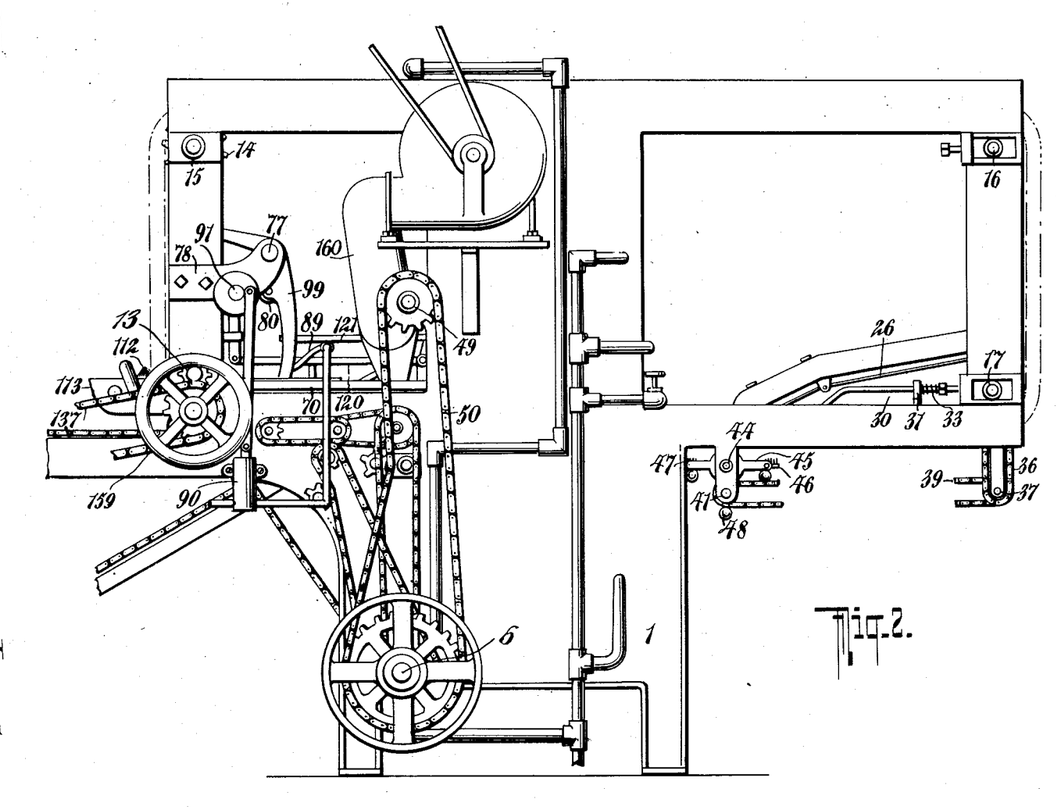
Figure 3:
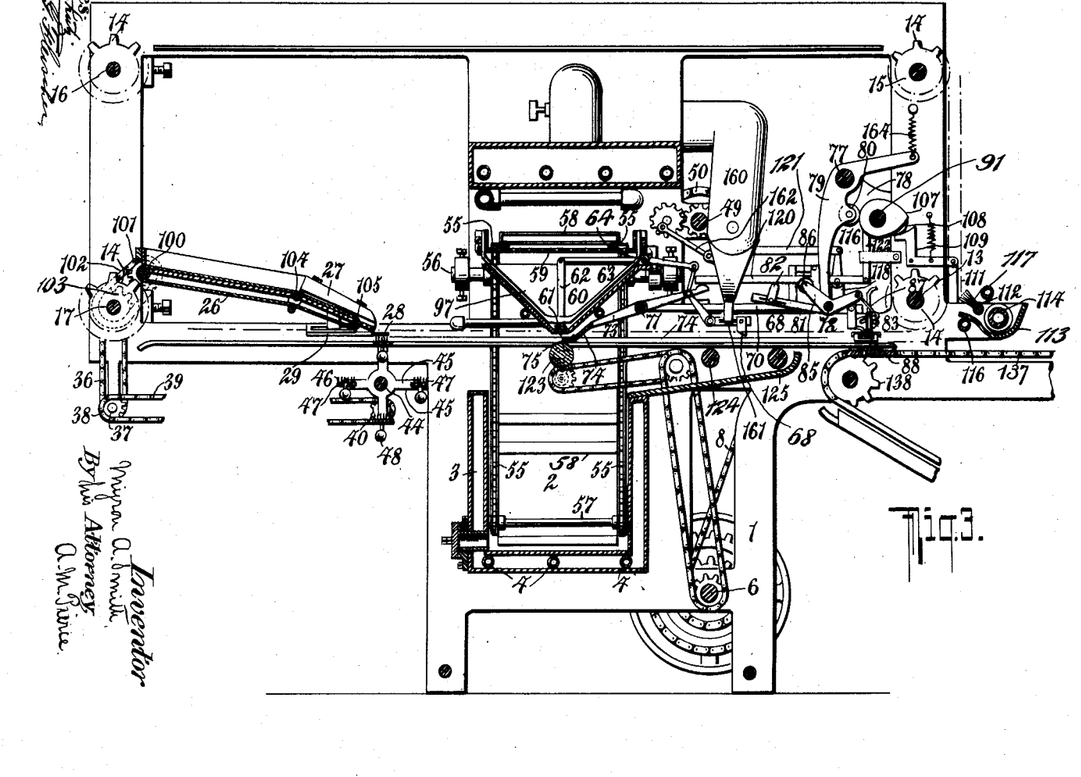
Fig. 3 is a vertical, longitudinal sectional view at line a—a of Fig. 4.
Figure 4:
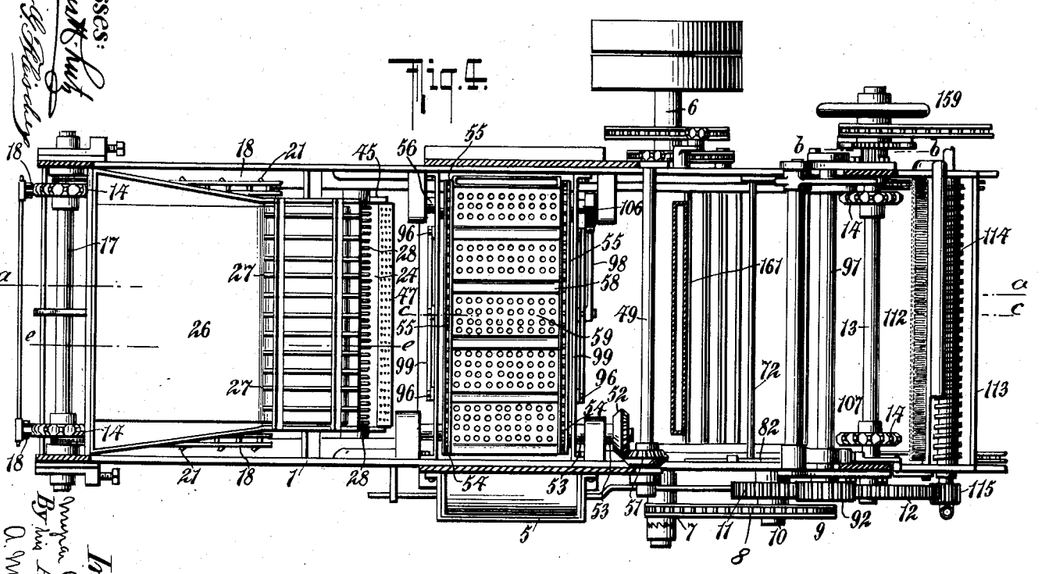
Fig. 4 is a plan view.
Figure 17:
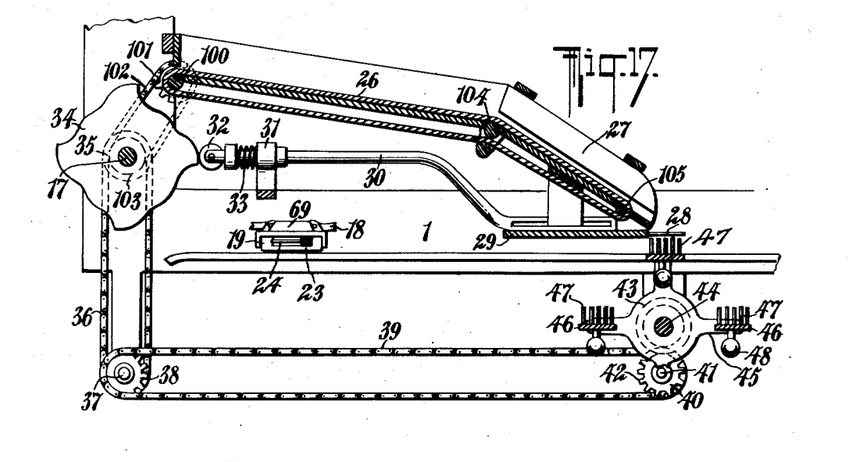
Fig. 17 is an enlarged vertical sectional view at line e—e of Fig. 4.

26 is a feeding apron passing over a shaft 100 provided with a sprocket 101 from which a driving chain 102 passes to a sprocket 103 on the shaft 17. The belt 26 passes around rollers 104 and 105, and beneath guide-strips 27, between which the centers to be coated pass to fingers 28 projecting from a horizontally movable bar 29 normally occupying the position shown in Figs. 3 and 17 of the drawing. The bar 29 is provided with a rod 30 passing through support 31 and bearing a wheel 32 and spring 33. On the shaft 17 is a cam 34 against which the wheel 32 is held by the spring 33.

35 is a sprocket on the shaft 17 from which passes a chain 36 to a sprocket on a shaft 37, a second sprocket 38 on this shaft engages a chain 39 passing to a sprocket 40 on a stud 41 which carries a gear 42 meshing with a gear 43 on a shaft 44.

45 are arms projecting from the shaft 44, and 46 are shelves pivoted in said arms, the shelves being provided with upwardly projecting pins 47, and being maintained in a horizontal position by weights 48.

When the machine is in operation, the centers to be coated rest on the fingers 28. In their forward movement, the carriers pass beneath the row of centers on the fingers 28, and the movement of the cam 34 permits the fingers 28 to be withdrawn as each carrier reaches the proper position, the centers passing to the pins 47 which project between the carrier fingers 24, and the shelves 46 moving in unison with the carriers, lower the centers thereon, and then drop out of the way. The transferring mechanism above described being substantially the same as that shown and described in my copending application filed August 6, 1903, Serial No. 168,411.

49 is a shaft journaled in the main frame, driven by a chain 50 passing from a sprocket on the shaft 6.

51 is a miter gear on the shaft 49 meshing with a gear 52 on a shaft 53 bearing a sprocket 54, over which passes a chain 55, and over corresponding sprockets on shafts 57 within the tank 2.

58 are buckets carried by the chains 55 arranged to elevate the coating material from the tank 2 and spread it over a perforated plate 59, from which it falls into a hopper 60 the bottom whereof has a longitudinal slot, the opening and closing of which is accomplished by means of a valve-plate 61 operated by vertical rods 62 pivoted to rockarms 63 on a shaft 64 connected to a crank 65 from which a rod 66 extends to a pivoted bar 67 provided with an adjustable finger 68 arranged to strike a projection 69 on alternate links of the chains 18.

Pivoted at 96 above the hopper 60 are stirring bars 97 which are driven by a rod 98 passing from a connecting bar 99 to an eccentric 106 on the shaft 56.

70 are horizontal bars at each side of the main frame, connected together by cross-bars 71 and 72. On the rod 71 are fixed arms 73 bearing at their lower extremities a blade 74 having a curved lip 75 extending beneath the bottom of the hopper 60.

76 is an extension of the upper extremity of an arm 73.

77 is a shaft in brackets 78 at each side of the main frame.

79 is an arm mounted on the shaft 77, and bearing a contact wheel 80. The lower end of the arm 79 is forked to engage the cross-bar 72.

Carried by the bars 70 are pieces 81 having an adjustable finger 82 near the inner extremity, and an adjustable bracket 83 at the outer extremity, the bracket 83 being provided with a segmental slot 84 and a curved guide 93.

On the cross-bar 72 is a bell-crank 85, one arm bearing a wheel 86 and the other arm a link 87 passing to a flattened tube 88. The ends of the tube 88 are closed and provided with trunnions which enter the slots 84 in the brackets 83.

89 is a flexible tube passing to a pump 90 driven by a shaft 91. This pump provides a circulation of hot water through the tube 88. The shaft 91 has a gear 92 which meshes with the gear 12. Fixed to the main frame is an arm 94 bearing an adjustable finger 95 arranged to contact with a wheel 86.

200 is a guide plate upon each bracket 83.

Figure 19:
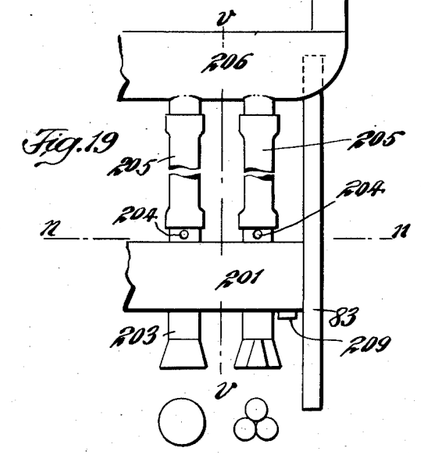
Fig. 19 is an enlarged rear elevation of a part of the marking mechanism, looking from the left in Fig. 9.
Figure 20:
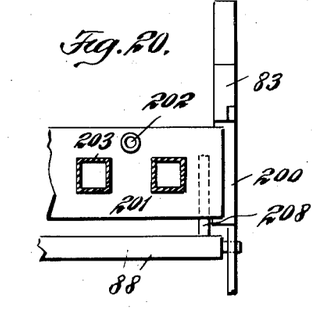
Fig. 20 is a horizontal sectional view at line n—n of Fig. 19.

201 is a square tube movably mounted in these guide plates and provided with a hot water connection 202. Movably held in passage ways in the tube 201 are tubes 203 having their lower extremities of any desired shape, as illustrated in Fig. 19.

204 are stop pins extending from each tube 203.

205 are flexible connections from each tube 203 to an air supply pipe 206.

207 represents a coated center.

208 is an arm projecting from the tube 88 arranged to engage a projection 209 near the end of the tube 201.

107 is a cam on the shaft 91 designed to actuate the arm 79. 108 is a cam also on the shaft 91, arranged to rock a bell-crank 109 pivoted at 110, the outer arm of the crank engaging a crank 111 carrying a brush 112 extending across the machine above a trough 113 wherein is mounted a conveyer 114 the shaft whereof bears a gear 115 meshing with the gear 12.

116 and 117 are steam pipes for heating the trough and brush.

118 are standards whereon are pivoted cranks 119 connected at their lower arms to a bar 120 and at their upper arms to a bar 121. Extending upward from the bar 120 is an arm 122 adapted to be moved by the cam 108.

123 is a roller beneath the outlet of the hopper 60 designed to apply coating material to the bottoms of the centers and also assist in spacing the centers on the carriers before the coating is applied. 124 and 125 are similar rollers for removing surplus coating material from the bottoms of the coated goods.

126 are receiving plaques which are first placed in a magazine 127, the ends of which are movable in fixed ways 128, and provided with fingers 129.

At 130 is fixed a spring 131 having an inward turned end 132 at its free extremity on which the stack of plaques normally rest.

A bar 133 passes from an eye 134 on the spring-plate to a crank 135, the free end whereof has a finger 136.

137 are sprocket chains passing over sprockets 138 and around wheels 139 and 140 and over idlers 152. These chains are connected by cross-bars 141. Loosely mounted at each side of the cross-bars are plates 142, each pair connected together by a rod 143 at their lower ends, and having an inwardly projecting step 144 at the top.

Pivoted in each plate 142 are a pair of fingers 145 having lugs 146 projecting over a hole 147 in the plate; the lower ends of the fingers 145 are connected together by a spring 148.

Figures 11, 12, 13:
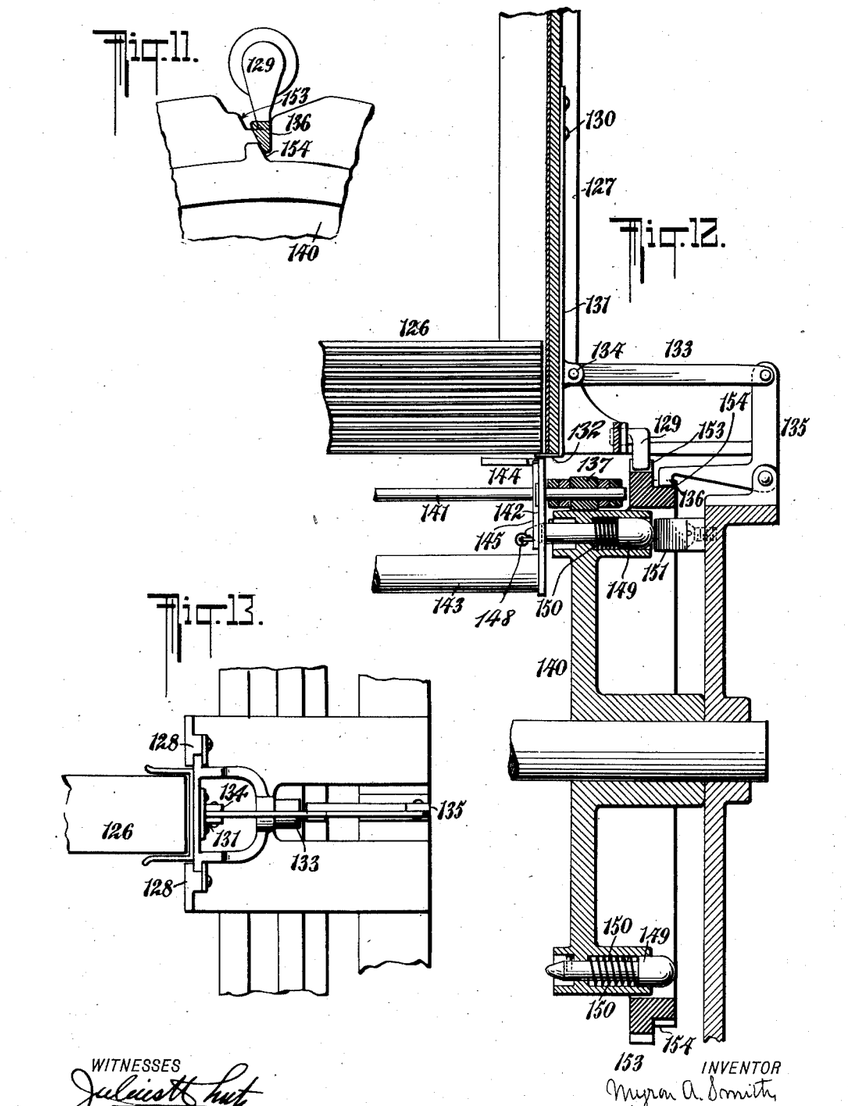
Figs. 11, 12, 13, 14, 15 and 16 are enlarged detail views of the same.

In the inner faces of the wheels 140 and 139 are pins 149 normally pushed inward by springs 150 as indicated at the bottom of Fig. 12. Lugs 151 fixed to the frame are provided for forcing each pin outward as the wheels revolve. On the wheel 140 are cam surfaces 153 and 154.

155 is a receiving shelf for the loaded plaques.

156 is a sprocket from which a chain passes to a sprocket on the shaft 158, and by which the removing mechanism is driven, and for convenience in moving the said mechanism independent of the movement of the entire machine, a hand wheel 159 is provided.

160 is a conduit for compressed air, having a restricted nozzle 161 extending across the machine. The nozzle 161 is pivoted to the conduit 160, and by means of a rod 162 passing to driving mechanism, said nozzle may be caused to vibrate changing the angle of impact of the air blast relative to the surface of the coated goods, thereby removing much of the adhering coating material, thinning the coating as required.

Figure 21:
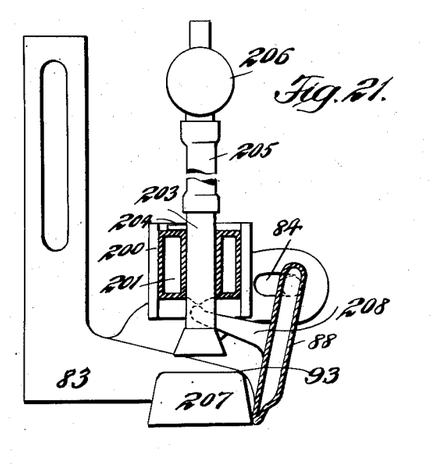
Fig. 21 is a vertical sectional view at line v—v of Fig. 19 with the marker raised.
Figure 22:
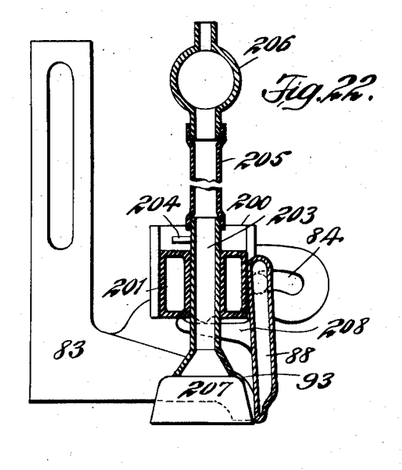
Fig. 22 is a view with the marker lowered.

The operation of the machine is as follows: Centers to be coated are placed on the belt 26 and are carried between the guide-strips 27, spacing the rows of centers apart the proper distance when they reach the pins 28, which are withdrawn from beneath a row of centers as a carrier bar passes beneath them, and a shelf having the upwardly projecting pins 47 receives the row of centers, moves in unison with the carrier bar, and drops away leaving the centers resting on the carrier. The loaded carriers pass from the feeding device toward the hopper 60, and just as each carrier bar passes beneath the hopper, the bars 70 are depressed through the medium of finger 82 forced downward by the bar 120, arm 122 and cam 108, raising the plate 74 with the lip 75 and at the same time the bars 70 are moved toward the hopper by the arm 79 and cam 107. This causes the bar and lip to rock over the carrier bar and rest upon the pins thereof between the bar and the centers to be coated, pushing any centers that are too close to the bar out on the fingers in a straight row, and at the same time preventing the coating material from falling on the bar itself. Should any of the centers be too far out on the pins of the carrier, the rotation of the roller 123 which is covered with coating material, falling thereon from the material hopper, will carry such centers up against the lip 75 into line, and at the same time the coating material will be applied to the bottoms of the centers by the roller 123. As a row of centers passes beneath the hopper 60, the valve-plate 61 is raised by the finger 68 striking a projection 69 on the carrier chain, permitting the coating material to escape from the hopper onto the centers, and as soon as the row of centers passes, the flow of material is cut off. The coated centers now pass beneath the air blast nozzle, which is in movement, directing the escaping air so that it strikes the goods at varying angles, resulting in the blowing off of as much of the coating material as may be desired, leaving the surface of the goods smooth and evenly coated. As each row of coated goods reaches the combined removing and marking device 88, the carrier bar is caused to move suddenly forward in its bearings, as the dog 21 at each side which has been held in the positions indicated by dotted lines in Fig. 6 of the drawing by contact with a projection 163 at the side of the main frame, is released, and the action of the springs 25 moves the bar, as shown in full lines in said figure. The fingers of the carrier withdraw from beneath the coated goods, which are held against forward movement by the device 88, dropping the goods onto the receiving plaques. As this movement of the carrier takes place, the device 88 is raised through the medium of the brackets 83, rods 81, finger 82, bar 120, arm 122 and cam 107, and at the same time the device moves forward, and rocks over the tops of the goods, passing up the guides 93, being so moved by the links 87 engaging the cranks 85, which in turn are actuated by the wheel 86 striking the fixed finger 95, the brackets and connected parts being moved forward at the same time by the arm 79 which is drawn against the cam 107 by a spring 164. As the device 88 passes upward over the goods, a line of coating material is drawn together on the surface of each piece, giving the appearance usually found in hand coated goods. In marking the tops of the goods, the tubes 203 descend on the melted coating, as illustrated in Fig. 22, and a light suction of the air in the said tubes raises the coating material slightly, and then the tubes are lifted as in Fig. 21, and at the same time air pressure is created in the tubes, replacing the coating material lifted by the tubes, upon the goods, forming a raised ridge or line thereon, in accordance with the shape of the mouth of each tube.

Figure 14:
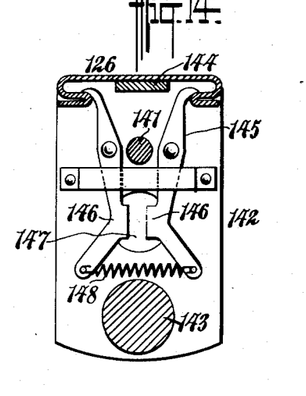
Figure 15:
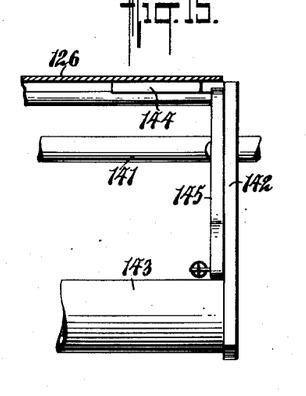
Figure 16:
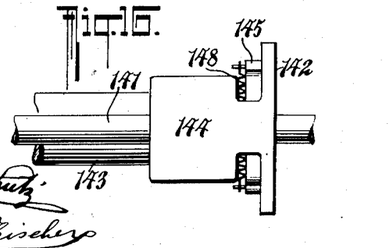

When the carrier passes away from the removing mechanism, and comes opposite to the brush 112, the bristles of the brush are brought in contact with the carrier, removing coating material adhering thereto, and then the brush returns to its initial position, the heat from the pipes 116 and 117 insuring the flow of the material from the brush into the trough 113, from whence it is removed by the conveyer therein. The coated goods pass from the carriers to the plaques 126. These plaques are made of any approved material, and are stacked within the magazine 127, as particularly shown in Fig. 12 of the drawing. As the chain 137 moves, a pair of plates 142, and connected parts, is brought beneath the magazine. The supporting fingers 129 pass down the cam-surface 153 of the wheel 140 lowering the magazine, and at the same time the supporting plates 131 are withdrawn by the connected parts and the cam 154, permitting the bottom plaque to rest on the steps 144. At this time the pins 149 are forced by the lugs 151 between the fingers 145, drawing the upper extremities of the fingers together so as to permit the plaque to drop to its lowest position. Continued movement permits the pins 149 to pass from the lugs 151, the springs 148 drawing the lower ends of the fingers 145 together, causing their upper extremities to engage and hold the plaques, as particularly shown in Fig. 14 of the drawing. The dropping of the finger 136 from the projection 154 permits the spring-piece to pass beneath the stack of plaques, and the movement of the finger 129 up the cam-surface 153 raises the stack out of the way.

Figure 10:
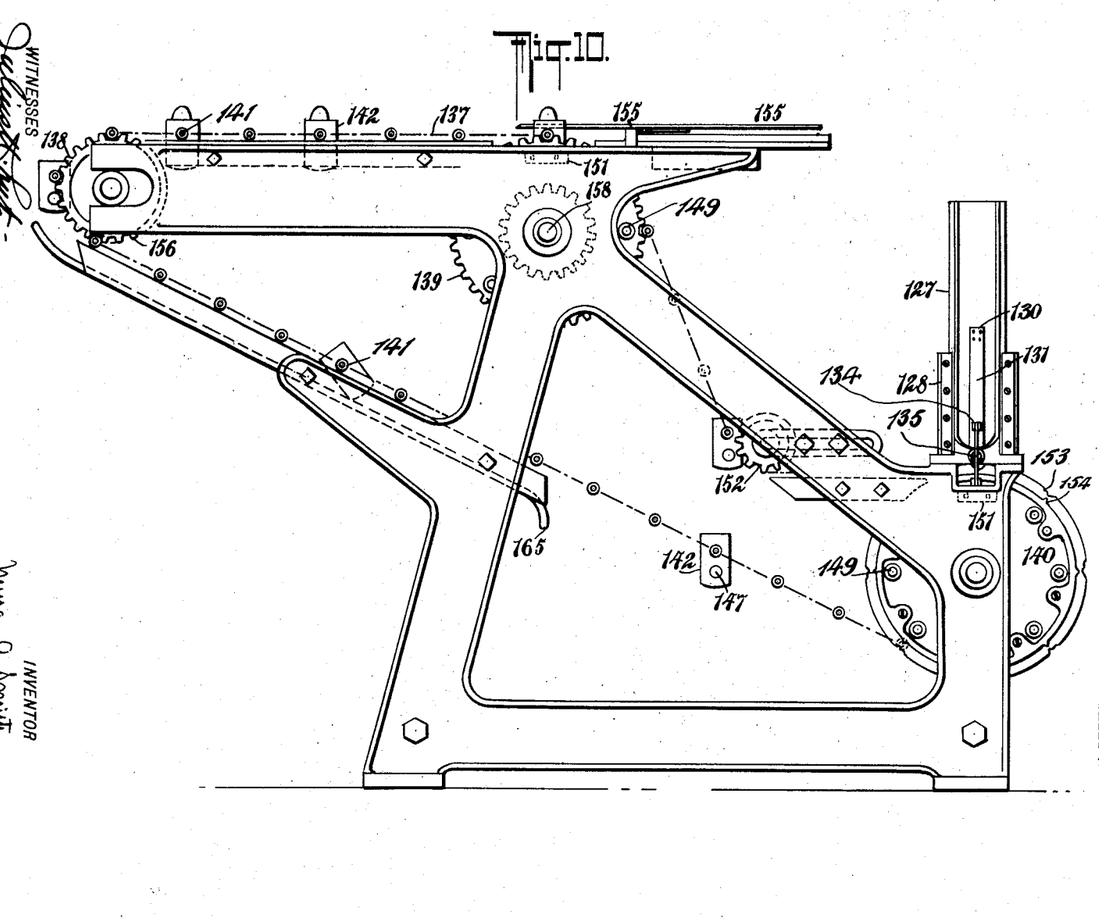
Fig. 10 is a side elevation of the mechanism for removing the coated goods.

The plaques are supported and held horizontally, excepting when they strike the plate 165 which turns the plaques at an angle, the object of this operation being to prevent the adhesion to the fresh plaque of any goods, etc., which might fall thereon as it passes to the removing mechanism. The loaded plaques move horizontally, as shown in Fig. 10 of the drawing, and when they reach the shelf 155 they pass over it, the holding fingers being released in the manner above described when the plaques are received. As each plaque is released, it pushes the preceding plaque forward on the shelf 155, the loaded plaques being removed therefrom to the cooling room.

Where desirable, the horizontal carrying mechanism for the coated goods may be made of such length as to give the goods sufficient time to cool, and the goods packed immediately upon removal therefrom, and in such case, the self-feeding plaque mechanism may be dispensed with.

Having now fully described my invention, what I claim as new therein and desire to secure by Letters Patent, is:

1. In a coating machine, a center feeding device in which is comprised a sloping, movable belt, and guide-strips fixed thereover, in combination with transferring mechanism, and a series of horizontally movable finger bars constituting receiving carriers.

2. In a coating machine, the combination with the carrier-bars of a bar-protecting and center spacing device adapted and arranged to rock thereover.

3. In a coating machine, the combination with a coating material hopper, of a carrier-bar, a spacing and bar-protecting plate adapted to rock thereover, and a spacing and bottom-coating roller mounted beneath the path of the carrier-bar.

4. In a coating machine, the combination with a carrier for centers to be coated, of means for flooding the centers with coating material, and a roller for applying material to the bottoms of the centers.

5. In a coating machine, a coating material hopper having a continuous, longitudinal opening in its bottom, and a plate adapted to open and close said opening, in combination with a carrier for centers to be coated, and means for moving said carrier beneath the hopper.

6. In a coating machine, the combination with a material hopper having a continuous longitudinal valve in its bottom, of a series of carriers, and means for operating said valve through the medium of the movement of the carriers.

7. In a coating machine, the combination with a carrier for coated goods, of a combined removing and marking device.

8. In a coating machine, the combination with a carrier for coated goods, of a combined removing and marking device, and means for heating said device.

9. In a coating machine, the combination with a carrier for coated goods, of a movable, removing device, and means for heating the same.

10. In a coating machine, the combination with a carrier for coated goods, of a movable marking device, adapted to form a ridge of the material with which the goods are coated, and means for heating said marking device.

11. In a coating machine, the combination with a carrier for coated goods, of a hollow goods-removing and marking device, and means for causing the circulation of a heating medium through said device.

12. In a coating machine, the combination with a carrier for coated goods, of a goods-removing and marking device, and means for giving said device an oscillating movement, substantially in the arc of a circle.

13. In a coating machine, the combination with a carrier for coated goods, of a marking device adapted to be moved over said goods in the arc of a circle, and form a ridge of the material with which the goods are coated, and means for moving said device.

14. In a coating machine, the combination with a carrier in which is comprised a bar provided with projecting supporting fingers or pins, means for moving said carrier in a horizontal direction, and means for moving the carrier in its support, of a removing device and marking device for coated goods.

15. In a coating machine, the combination with a continuous carrier, of a brush mounted in close proximity to said carrier, and means for rocking said brush.

16. In a coating machine, the combination with a brush for removing coating material from the carriers, of means for rocking said brush, and means for removing coating material from the brush.

17. In a coating machine, the combination with removing mechanism for the coated goods, of a receiving-plaque carrier, in which is comprised an endless series of self-righting holders, means for automatically supplying un-loaded plaques to said carrier, and means for removing loaded plaques from the carrier.

18. In a coating machine, the combination with a hopper and means for supplying coating material thereto, of a longitudinal valve at the bottom of the hopper, means for operating said valve, a carrier for centers to be coated arranged to pass beneath the hopper, removing mechanism near the end of the forward movement of the center carrier, and a receiving plaque-carrier and means for automatically supplying and removing said plaques.

19. A coating machine in which is comprised a series of movable center carriers, means for moving said carriers, a hopper for containing coating material, means for supplying material to said hopper, means for permitting the escape of the material from the bottom of said hopper and for periodically shutting off said escape, a combined removing and marking device near the end of the forward movement of the series of carriers, and a receiving device in which is comprised means for automatically supplying plaques to receive the coated goods, and means for automatically removing the loaded plaques.

20. In a coating machine, the combination with a carrier for coated goods, of means for directing an air blast thereover, and means for moving the air outlet, varying the angle of impact of the blast.

21. In a coating machine, a coating material hopper having a continuous longitudinal opening in its bottom, means for controlling said opening, and a carrier for centers to be coated, in combination with a roller located beneath the opening in the material hopper.

22. In a coating machine, the combination with a carrier for coated goods, of an independent, movable marking device adapted to automatically form a ridge of coating material upon the goods.

23. In a coating machine, the combination with an automatic marking device adapted to raise coating material from the surface of coated goods, of means for retransferring coating material from the marking device to the surface of coated goods.

24. In a coating machine, the combination with an automatic marking device adapted to raise coating material from the surface of coated goods, of means for retransferring coating material from the marking device to the surface of coated goods by air pressure.

25. In a coating machine, the combination with an automatic marking device, of mechanical means for exhausting air and then compressing the same to assist the marking.

In testimony whereof I hereto affix my signature in presence of two witnesses.

MYRON A. SMITH.

Witnesses:
A. M. PIERCE,
C. G. HUTCHINSON.